United States Patent [19]
Nomura et al.

[11] 3,820,139
[45] June 25, 1974

[54] SHUTTER RELEASE MEANS IN A SINGLE LENS REFLEX CAMERA HAVING AN AUTOMATIC EXPOSURE TIME CONTROL OF INNER LIGHT MEASURING SYSTEM

[75] Inventors: Katsuhiko Nomura, Kawagoe; Naoyuki Uno, Iruma; Tadazumi Sakazaki, Tokyo; Koichiro Watanabe, Tokyo; Fumio Urano, Tokyo, all of Japan

[73] Assignee: Asahi Kogoku Kogyo Kabushiki Kaisha, Tokyo-to, Japan

[22] Filed: Aug. 14, 1972

[21] Appl. No.: 280,332

[30] Foreign Application Priority Data
Aug. 16, 1971 Japan................................ 46-72708

[52] U.S. Cl. ........................... 354/152, 95/10 CT
[51] Int. Cl. ................................................ G03b 3/00
[58] Field of Search............................. 95/42, 10 CT

[56] References Cited
UNITED STATES PATENTS

| | | |
|---|---|---|
| 3,533,343 | 10/1970 | Kobayashi............................ 95/42 |
| 3,581,642 | 6/1971 | Nomura................................ 95/42 |
| 3,601,026 | 8/1971 | Ettischer.............................. 95/42 |
| 3,623,410 | 11/1971 | Mita.................................. 95/42 X |
| 3,645,186 | 2/1972 | Kitai.............................. 95/10 CT X |
| 3,646,859 | 3/1972 | Umemura......................... 95/10 CT |
| 3,683,776 | 8/1972 | Ono..................................... 95/42 |

*Primary Examiner*—Samuel S. Matthews
*Assistant Examiner*—Richard A. Wintercorn
*Attorney, Agent, or Firm*—Christie, Parker & Hale

[57] ABSTRACT

A single lens reflex camera includes a snap-up mirror, a shutter curtain, a shutter curtain actuating button and an automatic exposure time control system which includes an exposure time memory circuit. The camera includes means for charging the shutter curtain and rotatable lever, and associated with the lever, a spring urges the lever means in a predetermined direction. The shutter button maintains the lever in initial position against the urging of the spring and releases the lever, allowing the lever to be urged and thereby rotate in the predetermined direction upon actuation of the shutter actuating button. A memory circuit changeover control switch is actuated by the lever rotating in a predetermined direction. A mechanism is actuated by the rotation of the lever in a predetermined direction after the switch is actuating for actuating the snap-up mirror or the shutter curtain in operative association with the lever and subsequently returns the lever to its initial position.

1 Claim, 3 Drawing Figures

PATENTED JUN 25 1974  3,820,139

SHUTTER RELEASE MEANS IN A SINGLE LENS REFLEX CAMERA HAVING AN AUTOMATIC EXPOSURE TIME CONTROL OF INNER LIGHT MEASURING SYSTEM

BACKGROUND OF THE INVENTION

The present invention relates to a control means in a single lens reflex camera, particularly in a single lens reflex camera with an electric shutter, having therein an automatic exposure time control of inner light measuring system.

Generally, a photographic camera of the aforementioned type is arranged such that when the light measuring is effected with full aperture, a memory circuit changeover switch is actuated within the period starting from depression of the shutter button and ending on actuation of a mirror so that the value of light intensity measured immediately before the mirror snaps up and a shutter curtain starts to run is stored by a memory circuit and is transmitted to the diaphragm control or the shutter control so as to obtain a correct exposure. This, however, has conventionally required extremely troublesome adjustments within a strict time limit between operation stages.

SUMMARY OF THE INVENTION

The above drawback is effectively overcome by an arrangement improved according to the present invention wherein the mutually associated mechanisms are actuated in sequence by provision of a second lever portion opposed to the mirror or to the diaphragm locking lever in operative associateion with the shutter button so that one end of this second lever actuates the changeover switch, starting movement of the mirror and starting actuation of the diaphragm locking lever.

DETAILED DESCRIPTION

Figure 1:
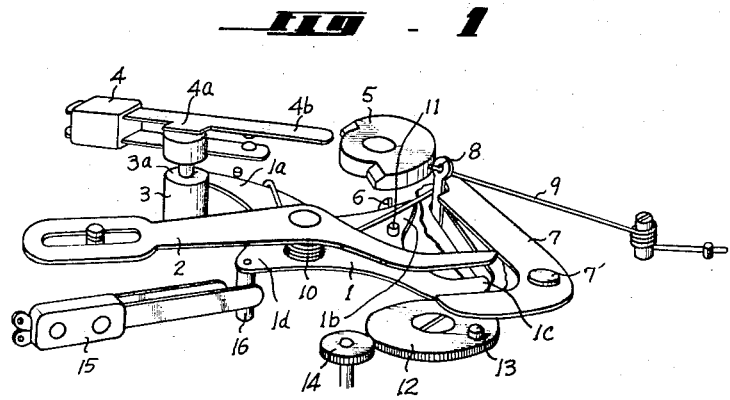
FIG. 1 is a perspective view of a portion of a single lens reflex camera according to the present invention in the state brought about after shutter charge has been effected.

A switch actuating lever 1 is provided coaxially with a charge lever 2 in a so-called "quick return" mirror mechanism. Lever 1 is biased to rotate, under resilience of spring 10, counter-clockwise according to the drawing. Quick return mirror mechanisms are disclosed in U.S. Pat. Nos. 3,240,136; 3,581,633; and 3,623,410 which are incorporated herein by reference. The lever 1 forms an actuation link and is pressed against the outer periphery of a shutter shaft 3, at a first portion or end 1a by its own rotating tendency and a second portion or end 1b thereof is engaged with the mirror and diaphragm locking lever 6. A third portion or end 1c of the lever 1 is arranged opposite to a mirror actuator lever 8 and a fourth portion or end 1d has a pin 16 opposed to a memory changeover switch 15. A cam 5 is opposed to a movable contact plate 4b of a main switch 4 which effectuates a changeover between automatic exposure and mechanical exposure in operative association with a shutter dial.

FIG. 1 shows the state after the shutter has been charged or spring-loaded, ready for an exposure operation by the charge lever 2. From the state as shown, depression of the shutter shaft 3 relieves a switching piece 4a of the main switch 4 from the influence of shutter shaft 3 under which the switching piece 4a has been urged upward against its own downward resilience. As a result, the switching piece 4a automatically swings downward, closing the main switch 4.

Closure of main switch 4 causes a measuring mechanism (not shown) to be energized, and a capacitor memory (not shown) to be charged. Further, depression of the shutter shaft 3 brings the end 1a of the lever 1 into a notch 3a of the shutter shfat 3, causing the lever 1 to be rotated counter-clockwise. This rotation is effected by the spring 10 which has been loaded or charged by the mirror charge lever 8. This rotation of the lever 1 also opens the memory changeover switch 15 through the pin 16 which, in turn, effects a cut-off of the main circuit, but the desired indication is transmitted to the diaphragm or to the shutter mechanism so long as the memory circuit is in the closed state. The memory changeover switch 15 is disclosed as switch 41 in U.S. Pat. No. 3,623,410. The shutter shaft 3 is maintained by the lever 1 in the depressed position even after relieved from the depressing force since the end 1a of said lever 1 is inserted in the notch 3a of said shaft 3. Diaphragm locking lever 6, or in the alternative, mirror actuator lever 20, is provided with a member (not shown) that starts to move with the corresponding lever. Such a member is illustrated in the above referenced U.S. Pat. Nos. 3,240,136 and 3,623,410, and drives the diaphragm mechanism so as to meet the predetermined diaphragm value. The end 1b of the lever 1 urges the locking lever 6 on the final step of rotation of the lever 1 so as to actuate the mirror actuator lever 20 so that lifting of the mirror, setting of the diaphragm, and actuation of the shutter are done in sequence for exposure.

A gear 12 is rotated by another gear 14 which is in operative association with the following closing of the shutter and a locking lever 7 is rotated clockwise around an axis 7' by a pin 13 planted on the gear 12. Accordingly, the mirror charge lever 8 is returned, causing the mirror 18 to be restored and the spring 10 is brought against a stop 11 on the lever 1, ceasing to rotate the lever 1 counterclockwise, which, in turn, on the final step of restoration of the mirror loading lever 8 (FIG. 2) is urged at the end 1c thereof and rotated clockwise. The lever 1 is thus disengaged from the shutter shaft 3, closing the changeover switch 15. Subsequent operation of the charge lever 2 forcibly rotates the mirror charge lever 8 and, at the same time, the spring 10 is effectively loaded for another photographing.

Figure 2:
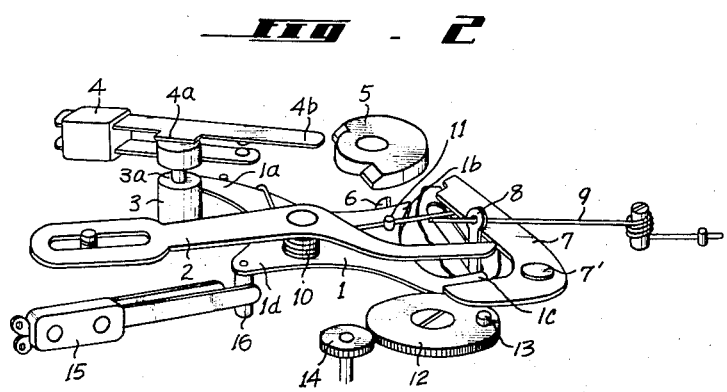
FIG. 2 is a perspective view similar to FIG. 1 in the state within a period from exposure to shutter charge.
Figure 3:
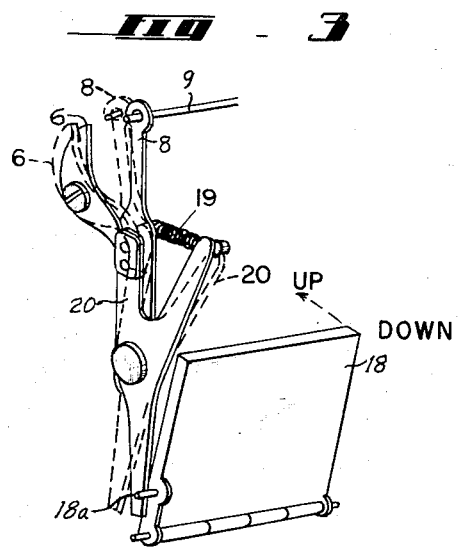
FIG. 3 is a perspective view showing a portion of the mirror actuating mechanism.

Consider the operation of the mechanism of FIGS. 1 and 2 in relation to the snap-up mirror operating mechanism. FIG. 3 illustrates the mirror snap-up actuating mechanism for the snap-up mirror 18. The position of the mirror 18 and the rest of the mechanism shown in FIG. 3 in solid lines illustrate the respective positions shown during the condition depicted in FIG. 2. Proceeding from the condition depicted in FIG. 2, actuation of the charge lever 2 in a counterclockwise direction rotates the lever 8 about the axis 21 in a counterclockwise direction, as seen in FIG. 3, until it arrives at the position indicated by broken lines for lever 8 in FIG. 3. This is also the position indicated for the lever 8 in FIG. 1.

The counterclockwise motion of the mirror charge lever 8 charges the spring 19, thereby urging the mirror actuator lever 20 in a counterclockwise direction. However, the lock lever 6 is restrained by the end 1b of the switch lever 1 and the lock lever 6, in turn, causes the mirror actuator lever 20 to be retained in the position indicated by solid line in FIG. 3. In this position, the locking lever 7 is rotated counterclockwise as depicted in FIG. 1 so that it engages and holds the mirror charge lever 8 in the position depicted in FIG. 1.

Under the conditions of FIG. 1, the mirror charge lever 8 is as indicated by broken lines in FIG. 3 and the rest of the mechanism is still in the position indicated by solid lines in FIG. 3.

Proceeding now from the condition illustrated in FIG. 1, depression of the shutter shaft 3 in a downward direction causes switch actuating lever 1 to rotate in a counterclockwise direction as depicted in FIG. 1 and the end 1a moves into the notch 3a of the shutter shaft 3. As a result of the turning of the switch actuating lever 1, the shutter locking lever 6 is urged by end 1b of the lever 1 about its axis 23 until it arrives at the position indicated by dashed lines in FIG. 3. This rotation of the locking lever 6 urges the mirror actuation lever 20 about its axis 21 to the position indicated by dashed lines in FIG. 3 which, in turn, allows the snap-up mirror 18 to rotate counterclockwise as indicated by the arrow in FIG. 3 to the "up" position. The end 1a of the lever 1 now being in notch 3a prevents the shutter shaft 3 from returning upward to its original positon.

The locking lever 6 and the mirror charge lever 8 are now both in the position indicated by dashed lines in FIG. 3 and the snap-up mirror is in the "up" position, also indicated by FIG. 3.

At the end of the shutter operation, when the shutter opens (running of the leading screen) and the shutter closes (running of the trailing screen), the gear 12 is turned by rotation of the gear 14, thereby winding the trailing screen. As the pin 13 on the gear 12 strikes the end of the locking lever 7, locking lever 7 is rotated in a clockwise direction as seen in FIG. 1, thereby releasing the mirror charge lever 8. The spring 19 which loads the mirror charge lever 8 causes the mirror charge lever 8 to move back to the position indicated by solid line in FIG. 3 until it strikes the end 1c of the switch actuating lever 1, causing it to rotate in a clockwise direction back to the original position as depicted in FIGS. 1 and 2. The clockwise rotation of the switch actuating lever 1 causes the end 1b to release the locking lever 6, enabling the mirror actuating lever 20 to rotate back from the position indicated by dashed lines in FIG. 3 in a counterclockwise direction to the position indicated by solid line, thereby acting against the pin 18a of the snap-up mirror 18, causing the snap-up mirror to rotate in a clockwise direction as depicted in FIG. 3 back to its "down" position. At this point, the mechanism has now returned to the position indicated by solid line in FIGS. 2 and 3.

According to the present invention, as seen from the foregoing description, provision of the lever 1 permits a series of shutter operations to be effected in sequence with reliability, facilitating the adjustment and assuring a correct exposure.

What is claimed is:

1. A single lens reflex camera having a shutter curtain and an automatic exposure time control system which includes an exposure time memory circuit, the improvement comprising:
  a. a mechanically operable changeover control switch for the memory circuit;
  b. a rotatable switch lever comprising
    1. an actuator portion for said switch,
    2. a mirror actuating portion, and
    3. a lever control portion;
  c. a first spring for urging said switch lever in a mirror actuating direction;
  d. an axially movable shutter actuating button having along a side a deactuating portion and a recessed actuating portion, the button being normally positioned with the deactuating portion engaging the control portion of said switch lever under urging by said first spring;
  e. a rotatable snap-up mirror;
  f. a rotatable mirror actuator lever having a first position in which it directly engages and positions said snap-up mirror out of a picture taking position and having a second position in which it directly engages and positions said snap-up mirror into a picture taking position;
  g. a rotatable loading lever;
  h. a second spring connected between said loading lever and mirror actuator lever and urging said mirror actuator lever toward said first position; and
  i. a rotatable mirror lock lever having a first position for directly engaging and maintaining said mirror actuator lever in said first position, the switch and lock lever being positioned so that axial actuation of said button allows the lever control portion to rotate into said recessed portion and during rotation cause the switch lever portion to actuate the switch and later cause the mirror actuating portion to engage and rotate the mirror lock lever to a second position which thereby engages and rotates the mirror actuator lever to its second position against the second spring, thereby enabling the snap-up mirror to be positioned in the picture taking position.

* * * * *